(No Model.)

A. WAHLIN, C. J. LUNDSTRÖM & T. COLLINS.
EXTRACTOR CHURN.

No. 432,714. Patented July 22, 1890.

Witnesses:
J. Staib
Chas. H. Smith

Inventors:
Adolph Wahlin
Carl Johan Lundstrom
Thomas Collins
per Lemuel W. Serrell, atty.

UNITED STATES PATENT OFFICE.

ADOLPH WAHLIN AND CARL JOHAN LUNDSTROM, OF STOCKHOLM, SWEDEN, AND THOMAS COLLINS, OF WINCHESTER, NEW HAMPSHIRE, ASSIGNORS TO R. DUNCAN HARRIS, OF NEW YORK, N. Y.

EXTRACTOR-CHURN.

SPECIFICATION forming part of Letters Patent No. 432,714, dated July 22, 1890.

Application filed April 14, 1890. Serial No. 347,750. (No model.)

*To all whom it may concern:*

Be it known that we, ADOLPH WAHLIN and CARL JOHAN LUNDSTROM, subjects of the King of Sweden, residing at Stockholm, Sweden, and THOMAS COLLINS, a subject of the Queen of Great Britain, residing in Winchester, in the State of New Hampshire, have invented an Improvement in Extractor - Churns, of which the following is a specification.

This invention is a modification of the devices set forth in our application, Serial No. 337,422, filed January 20, 1890. In our said application a rotary centrifugal separator is described and represented, in which the cream is thrown off at one place and the skim-milk at another, and such skim-milk is availed of in giving motion to butter-accumulators, against which the cream is caused to impinge. In our present improvements the butter-accumulators are constructed and arranged in such a manner that they may receive their motion from the skim-milk striking wings or fans, or the butter-accumulators may receive motion from a separate belt or belts in cases where greater agitation is required for the cream as thrown off from the separator.

Figure 1:
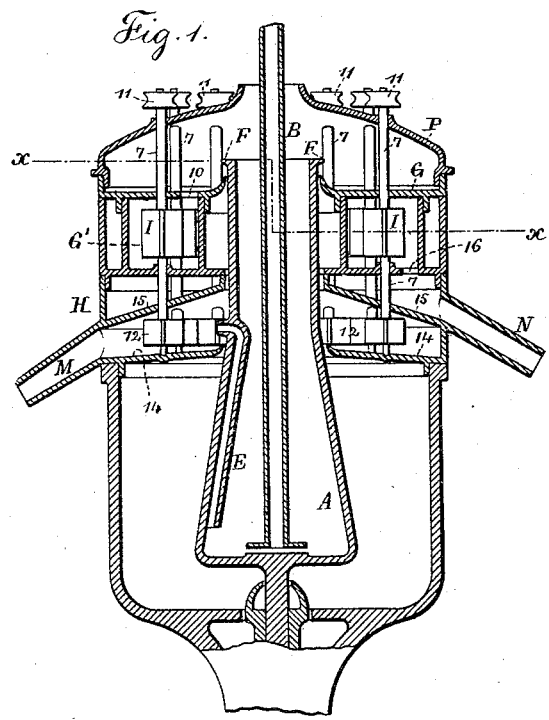
Figure 2:
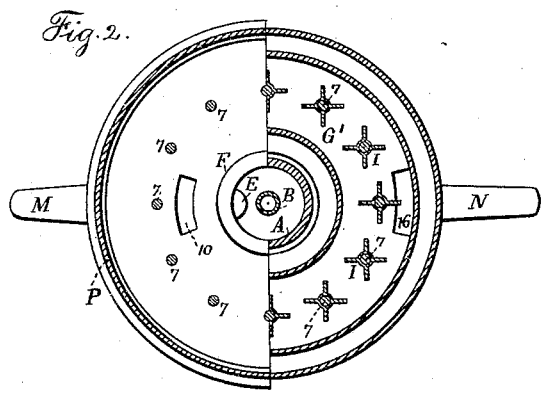

In the drawings, Figure 1 represents our improvements by a vertical section, and Fig. 2 is a sectional plan view on line $xx$ of Fig. 1.

The centrifugal vessel A is mounted upon a revolving shaft, and its axis is usually vertical. The pipe B is employed for supplying the milk from any suitable holder to the bottom of the vessel A, and the centrifugal action produces a separation of the skim-milk and the cream. A pipe E is provided for the discharge of the skim-milk as it accumulates, and there is an edge F at the upper part of the separator A, over which the cream is discharged. The cream passes into the pan G, beneath the cover P, and runs down through one or more openings 10 into the space in the vessel G' occupied by the butter-accumulators I. These butter-accumulators are in the form of fans or agitators upon the vertical shafts 7. These shafts extend up through the cover P and are provided with pulleys or spools 11 for a band or bands, which are passed around such pulleys and led off to a suitable drum or drums rotated by mechanical power, so that these butter-accumulators can be rotated by the pulleys and band or bands whenever necessary to give to the butter-accumulators a rapid movement or agitation to act upon the cream previous to the discharge of such cream from the opposite side of the annular vessel G' by the opening 16 and pipe or spout N. The skim-milk, as it issues from the upper end of the pipe E, comes forcibly into contact with the rotators 12 upon the shafts 7. These rotators are in the form of fans or blades projecting from the shafts 7, so that the force of the skim-milk, as thrown off by the centrifugal action, is communicated to these rotators to drive the butter-accumulators I. These rotators, under ordinary circumstances, will give to the butter-accumulators sufficient movement to agitate the cream and promote the separation of the buttery particles from the cream; but if the condition of the milk or of the weather is such that the agitation by the butter-accumulators is insufficient for the object desired the separation of the buttery particles from the cream is promoted by the more rapid rotation of the butter-accumulators I by the belt applied to the pulleys or spools 11, as aforesaid. The skim-milk passes off by the spout or pipe M from above the partition or pan 14. It is preferable to make the vessel G' holding the butter-accumulators I separable from the pan 14 and case H to facilitate cleaning, and the parts may be made of sheet metal or cast metal, as desired. The pulleys 11 and rotators 12 may be movable upon the ends of the shafts 7 and secured in place by friction, or the shafts may be made polygonal, so that the parts may be removed to facilitate separation and cleaning. It is also advantageous to connect the spout N with the conical partition 15 within the case and above the pan 14, so that the buttery particles passing down through the opening or openings 16 may be received into the annular space and pass down gradually by the spout N.

We claim as our invention—

1. The combination, with the centrifugal separator A and pipe E for the skim-milk, of the shafts 7 and butter-accumulators I and the vessel G', containing such accumulators, and into which the cream passes from the edge F of the centrifugal separator, the rotators 12 upon the shaft 7 of the butter-accumulators, with which the skim-milk comes into contact, the pan 14 for the skim-milk, and the spouts M for the skim-milk and spout N for the butter particles, substantially as set forth.

2. The combination, with the centrifugal separator having separate discharge-openings for the cream and skim-milk, of the vessel G', surrounding the separator and receiving the cream, the butter-accumulators I within said cream-receiving vessel, the shafts 7, and pulleys 11 for a belt or belts to give motion to such butter-accumulators, whereby they act directly upon the cream as separated, substantially as set forth.

3. The combination, with the centrifugal separator, of the cover P and the vessel G' around the centrifugal separator and receiving the cream, the pan 14 below the same for receiving the skim-milk, the conical partition 15 between the vessel G' and the pan 14, the spouts M and N for the skim milk and butter, respectively, the butter-accumulators I within the cream-vessel and their shafts 7, the rotators 12 contiguous to the discharge-opening for the skim-milk, and the pulleys 11 for giving motion to such butter-accumulators, substantially as set forth.

Signed by us this 10th day of April, 1890.

ADOLPH WAHLIN.
CARL JOHAN LUNDSTROM.
THOS. COLLINS.

Witnesses:
GEO. T. PINCKNEY,
WILLIAM G. MOTT.